United States Patent [19]

Kroksnes

[11] Patent Number: 4,759,890

[45] Date of Patent: Jul. 26, 1988

[54] PROCESS FOR MONITORING A SCREW OR WORM EXTRUDER, PARTICULARLY A PIN-CYLINDER EXTRUDER

[75] Inventor: Finn Kroksnes, Hamburg, Fed. Rep. of Germany

[73] Assignee: Fried. Krupp Gesellschaft mit beschrankter Haftung, Essen, Fed. Rep. of Germany

[21] Appl. No.: 945,333

[22] Filed: Dec. 22, 1986

[30] Foreign Application Priority Data

Dec. 21, 1985 [DE] Fed. Rep. of Germany ....... 3545747

[51] Int. Cl.⁴ .......................... B29B 7/72; B29C 47/92
[52] U.S. Cl. .................................. 264/40.2; 264/40.1;
 264/40.7; 425/136; 425/145; 425/149; 425/154
[58] Field of Search ..................... 264/40.1, 40.2, 40.6,
 264/40.7; 425/135, 136, 145, 149, 154; 364/473, 476

[56] References Cited

U.S. PATENT DOCUMENTS

| | | | |
|---|---|---|---|
| 3,704,972 | 12/1972 | Kneller et al. | 425/145 |
| 3,728,056 | 4/1973 | Theysohn | 425/145 X |
| 3,733,059 | 5/1973 | Pettit | 264/40.6 X |
| 3,799,719 | 3/1974 | Bonikowski et al. | 425/149 |
| 4,470,937 | 9/1984 | Sugimoto et al. | 264/40.1 |
| 4,508,454 | 4/1985 | Anders | 366/80 |
| 4,510,104 | 4/1985 | Weaver et al. | 264/40.7 |
| 4,550,002 | 10/1985 | Uhland et al. | 264/40.1 |
| 4,671,908 | 6/1987 | Gwinn et al. | 264/40.7 |

FOREIGN PATENT DOCUMENTS

| | | |
|---|---|---|
| 1554831 | 1/1970 | Fed. Rep. of Germany . |
| 1579002 | 9/1970 | Fed. Rep. of Germany . |
| 2335612 | 2/1974 | Fed. Rep. of Germany . |
| 3221472 | 6/1984 | Fed. Rep. of Germany . |
| 3023124 | 1/1985 | Fed. Rep. of Germany . |
| 58-11129 | 1/1983 | Japan ................... 264/40.1 |
| 58-126131 | 7/1983 | Japan ................... 264/40.6 |
| 58-126132 | 7/1983 | Japan ................... 264/40.6 |
| 59-54538 | 3/1984 | Japan ................... 264/40.1 |
| 59-81153 | 5/1984 | Japan ................... 425/136 |
| 60-116424 | 6/1985 | Japan ................... 425/145 |
| 925837 | 5/1963 | United Kingdom . |
| 1112390 | 5/1968 | United Kingdom . |
| 1484871 | 9/1977 | United Kingdom . |
| 576223 | 10/1977 | U.S.S.R. ................. 425/149 |
| 801111 | 1/1981 | U.S.S.R. ................. 425/145 |
| 802062 | 2/1981 | U.S.S.R. ................. 264/40.1 |
| 910424 | 3/1982 | U.S.S.R. ................. 425/145 |

OTHER PUBLICATIONS

Druck-und Temperaturmessungen an einem Einsc-hnecken-Extruder beim Verarbeiten von Polyäthylen weich by Prof. Dr. Ing. Georg Menges and Dipl.-Ing. Jens Müller, Aachen, pp. 631-643.

Betriebsverhalten einer Rohrextrusionsanlage by Dr.--Ing. W. Bauer, Ludwigshafen, pp. 157-162.

*Primary Examiner*—Jeffery Thurlow
*Assistant Examiner*—Leo B. Tentoni
*Attorney, Agent, or Firm*—Herbert Dubno

[57] ABSTRACT

In operation of a screw extruder, particularly a pin extruder, processing a rubber or a plastic mixture, troubling disturbances and on occasion heavy damage occur when foreign bodies are introduced into the extruder with the material to be processed causing damage to the extruder structure. In order to avoid this damage one possibility is to shut off the extruder at a sufficiently early time and of course immediately when an appropriate dangerous condition is detected. Therefore the drive torque which is taken by the extruder screw shaft is compared with the mass pressure in the mixture to be processed. As soon as this compared value no longer follows the functional dependence of the normal operating parameters such as the rotation speed of the extruder shaft, viscosity of the mixture, temperature lowering of the tempering medium, the volume increase of the mixture drawn in the extruder inlet or the like, the extruder is automatically shut off since a disturbance by foreign bodies is assumed. For determination of the torque a torque measuring shaft is used or a measured quantity proportional to it referred to. The mass pressure can be measured in the material to be processed by a mass pressure sensor in a pin of a pin cylinder in the extruder.

12 Claims, 1 Drawing Sheet

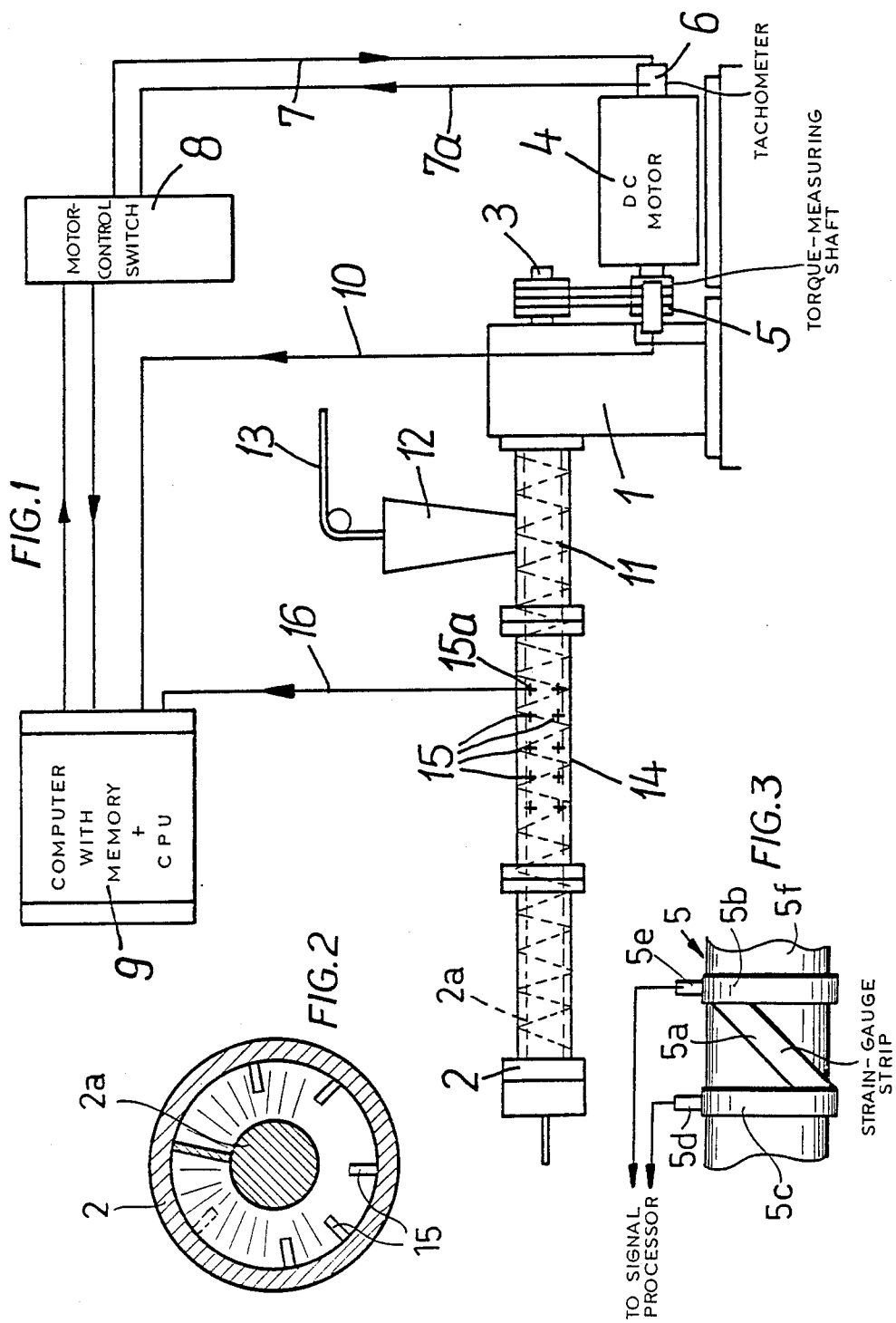

PROCESS FOR MONITORING A SCREW OR WORM EXTRUDER, PARTICULARLY A PIN-CYLINDER EXTRUDER

FIELD OF THE INVENTION

My present invention relates to a process for monitoring a screw or worm extruder, particularly a pin-cylinder extruder for processing a rubber and/or a synthetic resin mixture, i.e. a plastic mass.

BACKGROUND OF THE INVENTION

In operation of a screw or worm extruder with a plastic mass, unfortunately, from time to time foreign bodies, particularly metal pieces, are fed together with the mixture to be processed into the extruder.

These foreign bodies according to their shape and size cause deformations and fractures along the extrusion path. The damaged portions of the extrusion path usually cause heavy subsequent damage which frequently makes impossible further manufacturing with the extruder although the additional damage may not appear to be significant. That is particularly true for an extruder with a pin cylinder which is provided with an assembly of pins projecting into the extrusion chamber interrupting the extrusion path and which may be broken away.

This so-called pin extruder has had an increasing acceptance in the extruder market in recent years because of the higher output and lower extrusion temperature of this extruder in comparison with conventional extruder units.

An extruder with individual pin monitoring is taught in German Pat. No. 32 21 472. The disadvantage of the approach described in that patent document is the need to have the large number of pins each provided with means for signaling a pin break in order to carefully monitor the unit. When one considers that a pin extruder has more than 100 pins it is clear that the cost for such a pin break detector must be considerable. Also the plurality of connections between the pins and the drive shut off device are susceptible to operational disturbance by damage from the outside.

OBJECTS OF THE INVENTION

It is an object of my invention to provide an improved process and apparatus for monitoring a screw extruder, particularly a pin-cylinder extruder for the presence of foreign objects which obviates the above-mentioned disadvantages.

It is also an object of my invention to provide a process and apparatus for monitoring a screw extruder in which damage, particularly that due to the inclusion of foreign bodies in the mixture to be processed by the screw extruder, is avoided.

It is another object of my invention to provide a process and apparatus for monitoring a pin-cylinder extruder having a pin cylinder with an assembly of pins in which monitoring of individual pin breaking is not necessary.

SUMMARY OF THE INVENTION

These objects and others which will become more readily apparent hereinafter are attained in accordance with my invention in a process and apparatus for monitoring a screw extruder, particularly a pin-cylinder extruder with at least one pin cylinder for processing of a rubber and/or synthetic mixture, i.e. a plastic mass.

According to my invention the aforementioned disadvantages can be avoided and the objects of my invention attained when the current, voltage and/or rotation speed values present in the control panel for power consumption in the extruder are used for monitoring it. Furthermore tested measuring methods can be used.

Torque increases at the screw or worm shaft of the extruder have the following causes:

(a) foreign bodies in the mixture to be processed, particularly metal pieces, jamming the extruder near the pin cylinder,
(b) rotational speed increases for the extruder screw,
(c) viscosity increases in the mixture,
(d) temperature decreases in the tempering medium, and
(e) volume increases of the mixture drawn into the extruder inlet.

Experiments have shown that the effects (b) to (e) cause a mass pressure change in the extruder as well as simultaneously causing a torque change. Thus it is possible to separate the part of the torque increase that is due to cause (a).

According to my invention a process for monitoring a screw extruder, particularly a pin extruder with a pin cylinder for processing a rubber and/or plastic mixture comprises measuring the mass pressure of the mixture in the screw extruder as a reference value for the torque transfer between the extruder screw surrounded with the mixture and the cylindrical housing of the screw extruder, comparing the time course of the drive torque measured at a screw shaft of the extruder screw or a measured value proportional to the time course of the drive torque with the time course of the reference value determined from the mass pressure and, when the course of the torque at the screw shaft and the course of the reference value do not coincide, using the reference value as a measure of the change of the torque by foreign bodies or the like in the mixture and further, when an increase in the torque at the screw shaft of the extruder screw is detected, triggering an operation-interrupting signal and/or shutting off the screw extruder.

The measured value can be given in terms of dI/dt or dp/dt where I and p are respectively drive motor current and pressure generated by the driven screw.

Advantageously the mass pressure is measured with an electrical mass pressure sensor.

In an apparatus for monitoring a screw extruder having an inlet funnel, particularly a pin extruder with a pin cylinder with a plurality of cylinder pins for processing a rubber and/or plastic mixture, advantageously a mass pressure sensor is mounted in one of the cylinder pins of the pin cylinder. It is particularly desirable when the mass pressure sensor is mounted in one of the cylinder pins in a first row of cylinder pins closest to the inlet funnel of the screw extruder.

For determination of the total torque a torque measuring shaft can be used. It is also simpler to use a measured value proportional to the total torque. It is particularly suitable to use the direct current flow in the drive motor for the screw extruder as is standard today in the extruder unit. It is also advantageous when the drive motor has a tachogenerator.

The time difference between the detection of the total torque and the pressure change as a consequence of causes (b) to (e) is so small in normal operation without foreign bodies, particularly when the mass pressure sensor is positioned in the first row of cylinder pins in the feed direction, that the unit can be shut off when cause (a) is present in order to avoid damage.

In determining from the standard measured values whether case (a) is present their gradients particularly are compared with each other. However also the mean value and maximum values of the aforementioned measured values can be referred to for the determination.

It is also advantageous to supply all transport properties of a mixture to be processed in a test run and act as a data reference for later automatic operation.

Changes of the measured values inside a definite band width are neglected in the evaluation. Because of this band width measured data are continuously supplied.

The detection and evaluation of the measured values, particularly the mass pressure, rotation speed of the screw shaft and the direct current in the drive motor, is effected by an electronic computer. Storage of measured values in said computer is performed in a continuous loop so that always the last measured value is available in a given time interval according to storage capacity and selectable independently of scan time.

BRIEF DESCRIPTION OF THE DRAWING

The above and other objects, features and advantages of my invention will become more readily apparent from the following description, reference being made to the accompanying highly diagrammatic drawing in which:

FIG. 1 is a schematic partially side elevational view of a screw extruder in which the monitoring process according to my invention is performed;

FIG. 2 is a section through the pin cylinder; and

FIG. 3 shows a part of a torque - measuring shaft which can be used.

SPECIFIC DESCRIPTION

The screw extruder 1 in the embodiment shown in FIG. 1 has a three-part cylindrical housing 2 in which an extruder screw 2a rotates.

The extruder screw 2a with its extended screw shaft 3 is driven by a D.C. extruder drive motor 4 which has an electrical torque measuring shaft 5.

The extruder drive motor 4 is supplied with current by conductor 7 from a control panel 8.

A tachogenerator 6 for measuring the motor rotation speed is mounted on the extruder drive motor 4. The measured signal of the tachogenerator 6 is fed by conductor 7a to the control panel 8 and from there to an electronic computer unit 9.

This computer unit 9 also receives a measured signal from the torque measuring shaft 5 through a conductor 10.

The inlet member 11 of the housing 2 is provided with an inlet funnel 12 for feeding the mixture 13 to be worked to the extruder. In the center portion of the housing 2 which is formed as a pin cylinder, cylinder pins 15 are positioned (FIG. 2). In one of the cylinder pins 15 of the first row a mass pressure detector 15a is mounted. The measuring signal from the mass pressure detector 15a is transmitted to the computer unit 9 by a conductor 16 which shuts off the extruder during a torque increase caused by a foreign body being present in the mixture.

As can be seen in FIG. 3, the torque-measuring shaft segment, which can be any commercial torque-measuring shaft, can have a shaft portion 5f on which a plurality of strain-gauge strips 5a are mounted (only one of which is shown) and which are connected to sliprings 5b, 5c, in turn connected to the signal processing circuitry by brushes 5d, 5e.

A method of operating the pin extruder thus comprises passing a plastic mass selected from the group which consists of rubber and synthetic resins to the extruder at 13 to be plastified by the worm 2 driven by the electric motor 4 through the worm shaft 3 and the flight of the worm cooperates with a multiplicity of the radial pins 15 projecting into the cylinder to plastify the mass. The mass is introduced through the funnel 12 and pressurized in the cylinder while advancing the mass away from the funnel and plastifying the mass and extruding it from the cylinder.

The torque applied by the motor to the worm is measured at 5 or 6 and the pattern of measured torque with time is compared with the pattern of the pressure of said mass measured by the sensor 15a and operation of the motor 4 is terminated as described automatically upon a deviation of the torque and pressure patterns indicative of the presence of a foreign object in the mass.

I claim:

1. In a process for monitoring a screw extruder, particularly a pin extruder with a pin cylinder for processing a rubber and/or plastic mixture, the improvement comprising:
   (a) measuring the mass pressure of said mixture in said screw extruder as a reference value for the torque transfer between the extruder screw of said screw extruder surrounded with said mixture and the cylindrical housing of said screw extruder;
   (b) comparing the course of the drive torque said drive torque being measured at a screw shaft of said extruder screw, or the course of a measured quantity proportional to said drive torque with the course of said reference value determined from said mass pressure; and
   (c) when said course of said torque at said screw shaft and said course of said reference value do not coincide, using said reference value as a measure of the change of said torque by foreign bodies or the like in said mixture to trigger an operation interrupting signal shutting off of said screw extruder.

2. The improvement according to claim 1 wherein said mass pressure is measured with an electrical mass pressure sensor in a pin of said cylinder.

3. The improvement according to claim 1 wherein for the determining whether said increase of said torque as a result of said foreign bodies present in said mixture occurs, a direct current of a drive motor of said screw extruder is compared with said course of said mass pressure in said screw extruder and the required prerequisite for said shutting off of said screw extruder because of said foreign bodies in said mixture is the occurence of an increase of said direct current of said drive motor without a corresponding increase of said mass pressure and for determination whether a sufficient condition for said shutting off is present the time rate of change of a measured value is used taking into account the amount of said change of said measured value and a change in speed of said screw.

4. An apparatus for extruding a plastic mass selected from the group which consists of rubber and synthetic resins, comprising:
   a pin extruder having a worm rotatable in a pin cylinder fed with said plastic mass and driven by an electric motor through a worm shaft and wherein the presence of a foreign object in said mass causes an increase in the torque developed at said shaft, said cylinder having a plurality of radial pins projecting into said cylinder and cooperating with said worm to plastify said mass;

a pressure sensor on one of said pins for detecting the pressure of said mass in said cylinder;

a torque-sensing means operatively connected with said worm for detecting the torque on said worm; and signal-processing means responsive to said pressure sensor and said torque-sensing means for comparing the detected torque generated over a period of time with the mass pressure detected over the course of the same period and signalling the presence of said foreign object upon a deviation of the torque generation pattern from the detected pressure pattern.

5. The apparatus defined in claim 4 wherein said pressure sensor is mounted in said one of said pins in a first row of said cylinder pins closest to said funnel.

6. The apparatus defined in claim 5 wherein said motor has a tachogenerator and the direct current in said drive motor provides the torque measurement.

7. The apparatus defined in claim 5 wherein a torque measuring shaft is provided on the motor and supplies a measured value corresponding to the torque on the shaft of said worm.

8. The apparatus defined in claim 7, further comprising a computer to which said sensors are connected for terminating operation of said motor.

9. The apparatus defined in claim 8 wherein storage of measured values in said computer is performed in a continuous loop so that always the last measured value is available in a given time interval according to storage capacity and selectable independently of scan time.

10. A process for monitoring a screw extruder, particularly a pin extruder with a pin cylinder for processing a rubber and/or plastic mixture comprising:
   (a) measuring the mass pressure in said screw extruder with an electrical mass pressure sensor inside said screw extruder;
   (b) measuring the drive torque of said screw extruder and/or at least one of a plurality of standard operating parameters of said screw extruder including the rotation speed of a screw shaft of said screw extruder, the viscosity of said mixture in said screw extruder, the temperature lowering of a tempering medium used in said screw extruder and/or the volume increase of said mixture in said screw extruder which depend on said drive torque;
   (c) comparing said dependence of the course of said drive torque and/or the course of said standard operating parameters measured in step (b) with the course of said mass pressure; and
   (d) automatically shutting off said screw extruder or releasing an operation interrupting signal if the presence of a damaging condition such as the presence of foreign bodies in said mixture is indicated by the comparison in step (c).

11. A process according to claim 10, further comprising shutting off said screw extruder when the comparison in step (c) indicates an increase of said drive torque due to the presence of said foreign bodies in said mixture.

12. A method of operating a pin extruder in which a plastic mass selected from the group which consists of rubber and synthetic resins is plastified by a worm driven by an electric motor through a worm shaft and the flight of the worm cooperates with a multiplicity of radial pins projecting into the cylinder to plastify the mass, said method comprising the steps of:

introducing said mass through a funnel and pressurizing said mass in said cylinder while advancing said mass away from said funnel and plastifying the mass and extruding it from said cylinder;

measuring pressure in said mass with a pressure sensor;

measuring torque applied by said motor to said worm;

comparing the pattern of measured torque with time with the pattern of the pressure of said mass with time measured in said sensor; and terminating operation of said motor automatically upon a deviation of said pattern indicative of the presence of a foreign object in said mass.

* * * * *